United States Patent
Tong et al.

(10) Patent No.: US 10,305,116 B2
(45) Date of Patent: May 28, 2019

(54) COST-EFFECTIVE SOLID STATE REACTIVE SINTERING METHOD FOR PROTONIC CERAMIC FUEL CELLS

(71) Applicants: Colorado School of Mines, Golden, CO (US); CoorsTek, Inc., Golden, CO (US)

(72) Inventors: Jianhua Tong, Golden, CO (US); Meng Shang, Urbana, IL (US); Ryan Patrick O'Hayre, Golden, CO (US); Sophie Menzer, Lakewood, CO (US); W. Grover Coors, Golden, CO (US)

(73) Assignees: Colorado School of Mines, Golden, CO (US); CoorsTek, Inc., Golden, CO (US)

( * ) Notice: Subject to any disclaimer, the term of this patent is extended or adjusted under 35 U.S.C. 154(b) by 355 days.

(21) Appl. No.: 14/621,091

(22) Filed: Feb. 12, 2015

(65) Prior Publication Data
US 2016/0036064 A1    Feb. 4, 2016

Related U.S. Application Data

(60) Provisional application No. 61/938,785, filed on Feb. 12, 2014.

(51) Int. Cl.
*H01M 4/90* (2006.01)
*H01M 4/88* (2006.01)
(Continued)

(52) U.S. Cl.
CPC ....... *H01M 4/9033* (2013.01); *H01M 4/8621* (2013.01); *H01M 4/8828* (2013.01);
(Continued)

(58) Field of Classification Search
CPC ............ H01M 4/9033; H01M 4/8621; H01M 4/8889; H01M 2004/8689; H01M 2008/1293
See application file for complete search history.

(56) References Cited

U.S. PATENT DOCUMENTS

| | | | | |
|---|---|---|---|---|
| 3,377,203 A | * | 4/1968 | Rohland | H01M 4/9025 429/489 |
| 2007/0122674 A1 | * | 5/2007 | Horiuchi | C04B 35/48 429/483 |

OTHER PUBLICATIONS

Chendong Zuo et al., Ba(Zr0.1Ce0.7Y0.2)O3-d as an Electrolyte for Low-Temperature Solid-Oxide Fuel Cells, Advance Materials, Nov. 23, 2006, vol. 18, pp. 3318-3320.*

(Continued)

*Primary Examiner* — Osei K Amponsah
(74) *Attorney, Agent, or Firm* — Sheridan Ross P.C.

(57) ABSTRACT

The present invention relates to a protonic ceramic fuel cell and a method of making the same. More specifically, the method relates to a cost-effective route which utilizes a single moderate-temperature (less than or equal to about 1400° C.) sintering step to achieve the sandwich structure of a PCFC single cell (dense electrolyte, porous anode, and porous cathode bone). The PCFC layers are stably connected together by the intergrowth of proton conducting ceramic phases. The resulted PCFC single cell exhibits excellent performance (about 450 mW/cm² at about 500° C.) and stability (greater than about 50 days) at intermediate temperatures (less than or equal to about 600° C.). The present invention also relates to a two step method for forming a PCFC, and the resulting PCFC.

20 Claims, 13 Drawing Sheets

(51) Int. Cl.
  *H01M 4/86* (2006.01)
  *H01M 8/1213* (2016.01)
  *H01M 8/1246* (2016.01)
  *H01M 8/124* (2016.01)
  *H01M 8/1253* (2016.01)
  *H01M 8/126* (2016.01)

(52) U.S. Cl.
  CPC ....... *H01M 4/8889* (2013.01); *H01M 4/8892* (2013.01); *H01M 4/9025* (2013.01); *H01M 4/9066* (2013.01); *H01M 8/1213* (2013.01); *H01M 8/1246* (2013.01); *H01M 8/126* (2013.01); *H01M 8/1253* (2013.01); *H01M 2004/8689* (2013.01); *H01M 2008/1293* (2013.01); *H01M 2300/0074* (2013.01); *H01M 2300/0077* (2013.01); *Y02E 60/525* (2013.01); *Y02P 70/56* (2015.11)

(56) References Cited

OTHER PUBLICATIONS

Meng Shang et al., A promising cathode for intermediate temperature protonic ceramic fuel cells: BaCo0.4Fe0.4Zr0.2O3-δ, RSC Advances, Jun. 25, 2013, vol. 3, 15769-15775.*
D. Clark et al., Anomalous low-temperature proton conductivity enhancement in a novel protonic nanocomposite, Phys. Chem. Chem. Phys., Feb. 3, 2014, vol. 16, pp. 5076-5080.*
Yoon et al., Effect of Fuel Composition on Performance of Single-Step Cofired SOFCs, Journal of The Electrochemical Society, vol. 154, Issue 10, Aug. 22, 2007, pp. B1080-B1087 (Year: 2007).*
Shao et al., "A High-Performance Cathode for the Next Generation of Solid-Oxide Fuel Cells," Nature, 2004, vol. 431, pp. 170-173.
Shao et al., "A High-Performance Cathode for the Next Generation of Solid-Oxide Fuel Cells," Nature, 2004, vol. 431, pp. 170-173, 1 page, abstract only.
Cervera et al., "Structural study and proton transport of bulk nanograined Y-doped BaZrO3 oxide protonics materials," Solid State Ionics, 2008, vol. 179(7-8), pp. 236-242, abstract only.
Cook et al., "On the systematic selection of perovskite solid electrolytes for intermediate temperature fuel cells," Solid State Ionics, 1991, vol. 45(3-4), pp. 311-321, abstract only.
Cook et al., "Perovskite Solid Electrolytes for Intermediate Temperature Solid Oxide Fuel Cells," Journal of the Electrochemical Society, 1900, vol. 137(10), pp. 3309-3310.
Diethelm et al., "Improved stability of La0.5Sr0.5FeO3 by Ta-doping for oxygen separation membrane application," Solid State Ionics, 2009, vol. 180(11-13), pp. 857860, abstract only.
Ding et al., "Electrochemical performance of BaZr0.1Ce0.7Y0.1Yb0.1O3-δ electrolyte based proton-conducting SOFC solid oxide fuel cell with layered perovskite PrBaCo2O5+δ cathode," Journal of Power Sources, 2011, vol. 196, pp. 2602-2607.
Haworth et al., "Yttrium doped BSCF membranes for oxygen separation," Separation and Purification Technology, 2011, vol. 81(1), pp. 88-93, abstract only.
Islam et al., "Doping and defect association in AZrO3 (A=Ca, Ba) and LaMO3 (M=Sc, Ga) perovskite-type ionic conductors," Dalton Transactions, 2004, pp. 3061-3066.
Kreuer, "Proton-Conducting Oxides," Annu. Rev. Mater. Res., 2003, vol. 33, pp. 333-359, abstract only.
Li et al., "Synthesis and electrical properties of Co-doped Y0.08Sr0.92TiO3-δ as a potential SOFC anode,"Solid State Ionics, 2008, vol. 179(27-32), pp. 1588-1592, abstract only.
Li et al., "Synthesis and properties of Y-doped SrTiO3 as an anode material for SOFCs," Journal of Power Sources, 2007, vol. 166(1), pp. 47-52.
Liang et al., "Effect of various dopants on the tunable and dielectric properties of Ba0.6Sr0.4TiO3 ceramics," Ceramics International, 2005, vol. 31(8), pp. 1097-1101, abstract only.
Martynczuk et al., "Aluminum-Doped Perovskites As High-Performance Oxygen Permeation Materials," Chem. Mater., 2009, vol. 21(8), pp. 1586-1594, abstract only.
Nikodemski et al., "Solid-state reactive sintering mechanism for proton conducting ceramics," Solid State Ionics, 2013, vol. 253, pp. 201-210, abstract only.
Sammells et al., "Rational selection of advanced solid electrolytes for intermediate temperature fuel cells," Solid state Ionics, 1992, vol. 52(1-3), pp. 111-123, abstract only.
Shang et al., "A promising cathode for intermediate temperature protonic ceramic fuel cells: BaCo0.4Fe0.4Zr0.2O3-δ," RSC Advances, 2013, 3(36), pp. 15769-15775, abstract only.
Suksamai et al., "Measurement of proton and oxide ion fluxes in a working Y-doped BaCeO3 SOFC," Solid State Ionics, 2007, vol. 178(7-10), pp. 627-634, abstract only.
Tong et al., "Cost-effective solid-state reactive sintering method for high conductivity proton conducting yttrium-doped barium zirconium ceramics," Solid State Ionics, 2010, vol. 181(11-12), pp. 496-503, abstract only.
Tong et al., "Proton-conducting yttrium-doped barium cerate ceramics synthesized by a cost-effective solid-state reactive sintering method," Solid State Ionics, 2010, vol. 181(33-34), pp. 1486-1498, abstract only.
Tong et al., "Solid-state reactive sintering mechanism for large-grained yttrium-doped barium zirconate proton conducting ceramics," Journal of Materials Chemistry, 2010, vol. 20(30), pp. 6333-6341.
Ullmann et al., "Estimation of effective ionic radii in highly defective perovskite-type oxides from experimental data," Journal of Alloys and Compounds, 2001, vol. 316, pp. 153-158.
Wilson et al., "Quantitative three-dimensional microstructure of a solid oxide fuel cell cathode," Electrochemistry Communications, 2009, vol. 11(5), pp. 1052-1056, abstract only.
Yang, et al., "A Novel Composite Cathode for Low-Temperature SOFCs Based on Oxide Proton Conductors," Advanced Materials, 2008, vol. 20, pp. 3280-3283.
Yang et al., "Enhanced Sulfur and Coking Tolerance of a Mixed Ion Conductor for SOFCs:BaZr0.1Ce0.7Y0.2-xYbxO3-δ," Science, 2009, vol. 326(5949), pp. 126-129, abstract only.
Zhang et al.,"Double-site yttria-doped Sr1-xYxCo1-yYyO3-δ perovskite oxides as oxygen semi-permeable membranes," Journal of Alloys and Compounds, 2009, vol. 474, pp. 477-483.
Zhang et al., "Effect of Y and Nb codoping on the microstructure and electrical properties of lead zirconate titanate ceramics," Solid State Ionics, 2004, vol. 166(1-2), 219-223.
Zhao et al., "Investigation of Mixed Conductor BaCo0.7Fe0.3-xYxO3-δ with High Oxygen Permeability," Journal of Physical Chemistry C, 2010, vol. 114(41), pp. 17975-17981, abstract only.
Zhi et al., "Incorporation of yttrium in barium titanate ceramics," Journal of the American Ceramic Society, 1999, vol. 82(5), pp. 1345-1348.
Notice of Allowance for U.S. Appl. No. 15/184,425, dated Apr. 12, 2018 7 pages.
Official Action for U.S. Appl. No. 14/991,027, dated Mar. 15, 2017 6 pages Restriction Requirement.
Official Action for U.S. Appl. No. 14/991,027, dated Jun. 9, 2017 9 pages.
Official Action for U.S. Appl. No. 14/991,027, dated Oct. 23, 2017 6 pages.
Notice of Allowance for U.S. Appl. No. 14/991,027, dated Feb. 5, 2018 8 pages.
Official Action for U.S. Appl. No. 15/184,425, dated Oct. 20, 2017 6 pages Restriction Requirement.
Official Action for U.S. Appl. No. 15/184,425, dated Dec. 6, 2017 5 pages.

* cited by examiner

COST-EFFECTIVE SOLID STATE REACTIVE SINTERING METHOD FOR PROTONIC CERAMIC FUEL CELLS

CROSS REFERENCE TO RELATED APPLICATIONS

This application claims priority under 35 U.S.C. § 119(e) to U.S. Provisional Patent Application Ser. No. 61/938,785 filed Feb. 12, 2014, which is incorporated herein in its entirety by reference.

GOVERNMENT LICENSE RIGHTS

This invention was made with government support under grant DE-AR0000493 awarded by the U.S. Department of Energy. The government has certain rights in the invention.

FIELD OF THE INVENTION

The present invention relates to a novel approach for the fabrication of protonic ceramic fuel cells (PCFCs) using a one-step solid-state reactive sintering (SSRS) method from low cost oxides and carbonates.

BACKGROUND

The increasing world population and the demand to improve quality of life for a large percentage of human beings are the driving forces for the development of sustainable clean energies. Fuel cells, i.e. electrochemical devices that directly and efficiently convert chemical energy into electrical energy, have received growing interest in recent decades since they are the most promising, efficient, and environmentally benign energy-conversion devices. Among all types of fuel cells, solid-oxide fuel cells (SOFCs) possess the advantages of flexible fuels, high efficiencies, cost-effective electrodes, and rapid electrode reactions. However, the necessity for high operating temperatures has resulted in high costs and materials compatibility challenges.

The basic structure of a fuel cell consists of a fully dense electrolyte ceramic oxide sandwiched between a porous anode and a porous cathode. For the realization of this single cell configuration, multi-step preparation methods are usually employed (as illustrated in FIG. 1), which inevitably involve the synthesis of high-quality componential powders (electrolyte, anode, and cathode) from expensive precursors (e.g. nitrates) by complicated wet-chemistry routes and multi-time high temperature calcination and sintering (e.g. the dense electrolyte needs sintering temperature >1600° C.). As a result, the produced materials always need long processing time and high processing cost, which limits their practical application.

A key obstacle to reduced-temperature operation of PCFCs is the low activity of poorly-structured cathode attached to electrolyte membrane by high-temperature annealing (>1000° C.). Thus, a need exists for PCFCs that are easy and cost-effective to fabricate, while maintaining their high-performance. A need also exists for an intermediate-temperature (between about 300-600° C.) single cells with well-nanostructured cathodes involving low electrolyte densification temperatures (<1400° C.) and low cathode attaching temperature (<900° C.).

SUMMARY

The present invention relates to a protonic ceramic fuel cell and a method of making the same. More specifically, the method relates to a cost-effective route which utilizes a single moderate-temperature (less than or equal to about 1400° C.) sintering step to achieve the sandwich structure of a PCFC single cell (dense electrolyte, porous anode, and porous cathode bone). The PCFC layers are stably connected together by the intergrowth of proton conducting ceramic phases. The resulted PCFC single cell exhibits excellent performance (about 450 mW/cm$^2$ at about 500° C.) and stability (greater than about 50 days) at intermediate temperatures (less than or equal to about 600° C.). The present invention also relates to a two step method for forming a PCFC, and the resulting PCFC.

Using the SSRS method, the invention includes the design, which is scalable and easily to fabricate, of a synthesized single cell consisting of proton conductor, such as BCZYYb as an electrolyte, an anode, such as a BCZYYb-Ni cermet, and a porous cathode bone, such as BCZY63, which may be infiltrated with cathode nanoparticles, such as BCFZ, for intermediate temperature PCFCs. In most SOFC fabrication methods, the ion=conducting phase (e.g. the BCZYYb) is first calcined at a high temperature on its own from precursor materials to create a pure single phase powder, which is then ground and mixed with NiO and pore former, then sintered to form the anode. The present invention reacts the precursor materials with the NiO "in situ" during the sintering of the anode to produce the anode composite in a single step. By applying the SSRS method, the single cell may be easily and cost-effectively prepared. Because of the dense electrolyte, mixed conducting cathode, and porous cathode structure, the power density of the single cell may be higher (about 450 mW/cm$^2$ at about 500° C.) compared to the power density of fuel cells prepared by traditional method (225 mW/cm$^2$ at 600° C.). In addition, the PCFC cell also demonstrated stable open circuit voltage (OCV) for over 50 days when $H_2$ was used as fuel. The present invention relates to the design and preparation of an advanced, yet commercially practical and scalable single cell for fuel cell applications. The cells produced with the SSRS method may be used in solar cell, catalysis, separation technology, and other similar materials.

One aspect of the invention comprises a method for the fabrication of a protonic ceramic fuel cell. The method includes sintering in a single step a dense electrolyte, a porous anode and a porous cathode bone with a proton conducting ceramic at a temperature of less than about 1400° C. to form the protonic ceramic fuel cell. In some embodiments, the method further includes infiltrating a perovskite-type oxide into the porous bone cathode as a cathode nanoparticle at a temperature of between about 500° C. to about 900° C., or preparing a single-phase porous cathode composed entirely of a mixed-conducting perovskite type oxide such as BCFZY.

Another aspect of the present invention is a method for fabricating a protonic ceramic fuel cell comprising preparing an anode precursor comprising a BCZYYb/NiO50%, and dry pressing the anode precursor to form an anode substrate. An electrolyte precursor comprising BCZYYb/NiO1% is prepared then slurried before being applied to the anode substrate to form an electrolyte-anode substrate. A cathode bone precursor comprising BCZY63/$Fe_2O_3$1% is formed into a slurry of the cathode bone precursor, which is applied to the electrolyte-anode substrate to form a precursor substrate. The precursor substrate is co-fired at a temperature of about 1400° C. for about 18 hours to form the protonic ceramic fuel cell.

Another aspect of the invention is a protonic ceramic fuel cell. The fuel cell comprises an anode substrate, a layer of an electrolyte over the anode substrate, a porous bone cathode over the layer of the electrolyte and perovskite-type oxide within the porous cathode bone, wherein the perovskite-type oxide are in the form of nanoparticles.

DETAILED DESCRIPTION

Figure 1:
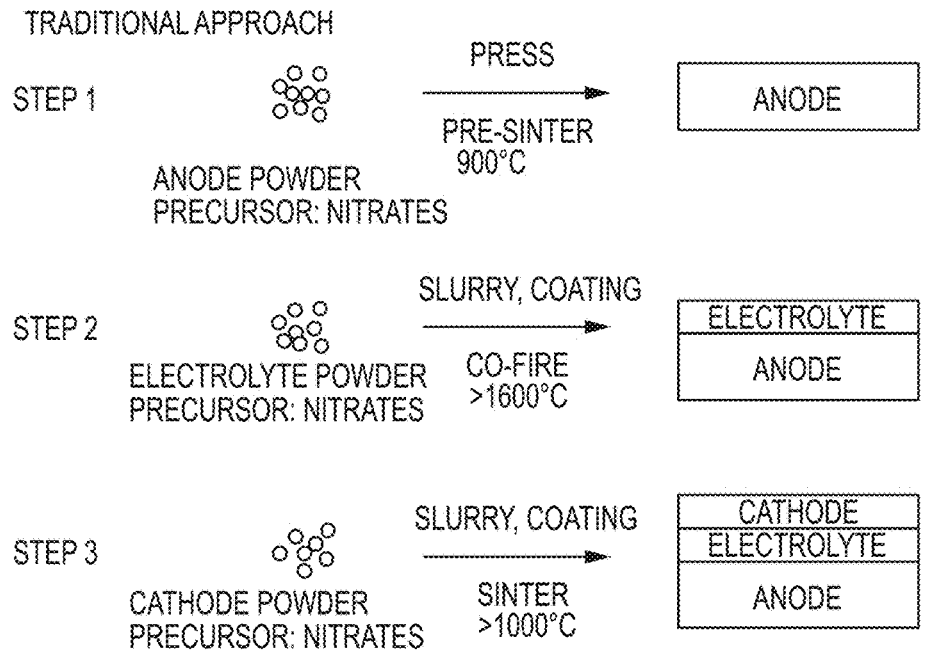
FIG. 1 illustrates a traditional method to produce a fuel cell.

The present invention relates to a PCFC, and methods of fabricating the same, wherein the PCFC is made using a SSRS process.

As provided herein, the abbreviations as used within this patent applications have the following meanings:

"BCZYYb" means $BaCe_{0.7}Zr_{0.1}Y_{0.1}Yb_{0.1}O_{3-\delta}$ or precursor solid mixture of $BaCO_3$, $CeO_2$, $ZrO_2$, $Y_2O_3$, and $Yb_2O_3$ according to the formula of $BaCe_{0.7}Zr_{0.1}Y_{0.1}Yb_{0.1}O_{3-\delta}$.

"BCFZ" means $BaCo_{0.4}Fe_{0.4}Zr_{0.2}O_{3-\delta}$ or precursor solution of mixed $Ba(NO_3)_2$, $Ce(NO_3)_3$, $Co(NO_3)_2$, $Fe(NO_3)_3$, and $ZrO(NO_3)_2$ according to the formula of $BaCo_{0.4}Fe_{0.4}Zr_{0.2}O_{3-\delta}$.

"BCZY63" means $BaCe_{0.6}Zr_{0.3}Y_{0.1}O_{3-\delta}$ or precursor solid mixture of $BaCO_3$, $CeO_2$, $ZrO_2$, and $Y_2O_3$ according to the formula of $BaCe_{0.6}Zr_{0.3}Y_{0.1}O_{3-\delta}$.

"BZY20" means $BaZr_{0.8}Y_{0.2}O_{3-\delta}$ or precursor solid mixture of $BaCO_3$, $ZrO_2$, and $Y_2O_3$ according to the formula of $BaZr_{0.8}Y_{0.2}O_{3-\delta}$.

"BCZY27" means $BaCe_{0.2}Zr_{0.7}Y_{0.1}O_{3-\delta}$ or precursor solid mixture of $BaCO_3$, $CeO_2$, $ZrO_2$, and $Y_2O_3$ according to the formula of $BaCe_{0.2}Zr_{0.7}Y_{0.1}O_{3-\delta}$.

One aspect of the present invention is a method for the fabrication of a protonic ceramic fuel cell. The method includes sintering in a single step a dense electrolyte, a porous anode and a porous cathode bone with a proton conducting ceramic at a temperature of about 1300-1450° C. The resulting protonic ceramic fuel cell includes an electrolyte, an anode and a cathode bone.

In some embodiments, the porous anode precursor material may be BCZYYb and NiO, BCZY63 and NiO, BZY20 and NiO, or BCZY27 (which contains 20 mol. % Ce) and NiO. In some embodiments, the porous anode comprises between about 35 wt. % to about 50 wt. % of BCZYYb, 35 wt. % to about 50 wt. % of the BCZY63, or between about 35 wt. % to about 50 wt. % of the BZY20, depending upon the components of the anode material. When NiO is also used, there may be between about 50 wt. % to about 65 wt. % of NiO in the porous anode material. In some embodiments, the porous anode material may further comprise between about 5 wt. % to about 40 wt. % of starch. In some embodiments, about 12 wt. % of starch may be used. The resulting anode may be BCZYYb/NiO, BCZY63/NiO, or BZY20/NiO. In some embodiments, the anode may comprise, by way of non-limiting example only, 50 wt. % BCZYYb/50 wt. % NiO, 40 wt. % BCZYYb/60 wt. % NiO, 50 wt. % BCZY63/50 wt. % NiO, or 50 wt. % BCZY63/50 wt. % NiO.

The dense electrolyte precursor material may be BCZYYb and NiO (CuO, ZnO, CoO), BCZY63 and NiO (CuO, ZnO, CoO), BCZY27 and NiO (CuO, ZnO, CoO or BZY20 and NiO (CuO, ZnO, COO). The dense electrolyte may comprise between about 90 wt. % to about 99.7 wt. % of the BCZYYb, and between about 0.3 wt. % to about 10 wt. % of the NiO. In some embodiments, about 99 wt. % of BCZYYb may be used with about 1 wt. % of the NiO. In some embodiments, CuO may be used as a sintering aid to improve sintering ability and decrease sintering temperature. The dense electrolyte may comprise between about 90 mol. % to about 99.7 mol. % of the BCZY63, and between about 1 mol. % to about 10 mol. % of the CuO. In some embodiments, about 95 mol. % of BCZY63 may be used with about 5 mol. % of the CuO. The dense electrolyte may comprise between about 90 mol. % to about 99 mol. % of the BZY20, and between about 1 mol. % to about 10 mol. % of the CuO. In some embodiments, about 95 mol. % of BZY20 may be used with about 5 mol. % of the CuO. The resulting electrolyte may comprise at least one of BCZYYb/Ni, BCZY63/CuO, or BZY20/CuO. Non-limiting examples of the electrolyte may include 99 wt. % BCZYYb/1 wt. % NiO, 99 wt. % BCZY63/1 wt. % CuO, or BCZY63/5 mol. % CuO.

The porous cathode bone may comprise a precursor material, which may be at least one of BCZY63, $Fe_2O_3$, Starch, BCFZ, BCFZY, and BCZY27. By way of example, in some embodiments, combinations include BCZY/$Fe_2O_3$/starch, BCZY63/$Fe_2O_3$/BCFZ and some materials comprise a single material, such as BCFZY or BCFZ. The cathode may comprise BCZY63/$Fe_2O_3$/starch, BCZY63/$Fe_2O_3$/BCFZ, BCZY63/$Fe_2O_3$/BCFZY, BCFZY, or BCFZ. By way of example, the cathode may be BCZY63/$Fe_2O_3$/starch and may comprise between about 0.1 mol. % to about 1 mol. % of $Fe_2O_3$. In some embodiments, the BCZY63/$Fe_2O_3$/starch cathode may comprise between about 99.9 mol. % and about 99 mol. % BCZY63, between about 0.1 mol. % to about 1 mol. % of $Fe_2O_3$, and between about 6 wt. % and about 12 wt. % of starch. In some embodiments, the mole percentage of $Fe_2O_3$ may be about 0.5. In some embodiments, the cathode may be BCZY63/$Fe_2O_3$/BCFZ and comprise between about 99.9 mol. % and about 99 mol. % of BCZY63, between about 0.1 mol. % to about 1 mol. % of $Fe_2O_3$, and between about 1 mol. % and about 10 mol. % of BCFZ. In some embodiments, the mole percentage of $Fe_2O_3$ may be about 0.5. In some embodiments, the cathode may be BCZY63/$Fe_2O_3$/BCFZY and comprise between about 1 mol. % and about 10 mol. % of BCZY63, between about 0.1 mol. % to about 1 mol. % of $Fe_2O_3$. In some embodiments, the mole percentage of $Fe_2O_3$ may be about 0.5.

In some embodiments, the method further comprises infiltrating a perovskite-type oxide into the porous bone cathode via solution infiltration which is subsequently converted to infiltrated cathode nanoparticles by heating at a temperature of between about 500° C. to about 900° C.

Another aspect of the present invention is a method for fabrication of a protonic ceramic fuel cell. The method includes preparing an anode precursor comprising a BCZYYb/NiO50%, then dry pressing the anode precursor to form an anode substrate. An electrolyte precursor that includes BCZYYb/NiO1% is prepared and used to form a slurry, which is applied to the anode to form a electrolyte-anode substrate. The electrolyte may be applied by screen printing the precursor material. A cathode bone precursor comprising BCZY63/$Fe_2O_3$1% is prepared, then formed into a slurry and applied to the electrolyte-anode to form a precursor substrate. The cathode precursor may be applied by screen printing. The precursor substrate is fired at a temperature of about 1300-1450° C. for between about 12 hours to about 24 hours to form the protonic ceramic fuel cell.

Another aspect of the present invention comprises a fabrication method of the PCFC cell. More specifically, when fabricating the cell, the anode may be pressed as a powder, by way of non-limiting example, into a pellet using a uniaxial die-press. The electrolyte may be applied as a paste and may be screen printed on the surface of the pellet. In some embodiments, the electrolyte and anode pellet may be sintered at a temperature less than about 1400° C., in some embodiments between about 1300° C. and about 1450° C., in some embodiments about 1400° C. The sintering temperature may be sintered for between about 10 hours and about 24 hours, in some embodiments about 18 hours. The cathode may be applied to the sintered material as a paste. By way of example, the cathode may be print screened on the sintered material. The paste may include a binder and a dispersant, such as solsperse, and may be printed on the top surface of the sintered material. The precursor cell may be sintered a second time at a temperature between about 800 C to about 1000° C., in some embodiments about 900° C. The precursor cell may be sintered for a second time for between about 3 hours and about 10 hours, and more preferably about 5 hours. Following the second sintering step is the PCFC may be formed.

Precursor Materials

Another aspect of the present invention relates to the formation of the precursor materials. Stoichiometric amounts of $BaCO_3$, $CeO_2$, $ZrO_2$, $Y_2O_3$, $Yb_2O_3$, and NiO may be weighed and mixed with 2-propanol as a ball milling medium to produce a BCZYYb/NiO50% precursor mixture as anode. The anode material may be ball milled for about between about 12 hours to about 48 hours, in some embodiments about 24 hours. The milled material may be dried at a temperature between about 70° C. and about 100° C., in some embodiments about 90° C. The drying time may be between about 12 hours and about 48 hours, in some embodiments about 24 hours. The anode powder may be pressed at any suitable pressure, by way of non-limiting example, at a pressure between about 300 MPa and about 500 MPa, in some embodiments about 375 MPa, for any suitable time, in some embodiments, between about 20 seconds to about 10 minutes, in some embodiments, about 2 minutes.

In some embodiments, the electrolyte precursor may be BCZYYb/NiO1%. Proper amount of $BaCO_3$, $CeO_2$, $ZrO_2$, $Y_2O_3$, $Yb_2O_3$, and NiO may be ball milled to produce a BCZYYb/NiO1% precursor mixture.

For the cathode bone, the $BaCO_3$, $CeO_2$, $ZrO_2$, $Y_2O_3$, $Fe_2O_3$, and Starch may be ball milled to produce a BCZY63/$Fe_2O_3$1%/Starch45% precursor mixture.

Slurries or pastes of the electrolyte material or the cathode bone material may be prepared by mixing the powder with a dispersant and binder. By way of example, about between about 5 g to about 20 g of the powder may be mixed with between about 1 g to about 4 g of 20 wt. % of the dispersant. In some embodiments, the dispersant may be solsperse 2800-30000 (Lubrizol) in terpinol, PEG200-1200 in water, cardanol in toluene, or PVB500-20000 in ethanol. Between about 1 g to about 5 g of a binder may be used. By way of example, between about 0.1 g to about 1 g of the binder may be used. In some embodiments, about 2 g of 5 wt % binder may be used. The binder may be V-006, Heraeus in Terpinol, PVB in ethanol/toluene, or PVA in water.

The electrolyte precursor material may be applied to the compressed precursor anode material. In some embodiments, the electrolyte precursor material may be screen printed on the compressed anode precursor material. In some embodiments, the cathode may be screen printed on the anode support.

The perovskite material may be prepared by dissolving metal nitrates in water with proper amount of citric acid (molar ratio of citric acid:total metal ions controlled to be around 0.6-2.5:1, which was used as a complex agent to facilitate the formation of the desired perovskite phase. Acetone may be added to the aqueous solutions with a volume ratio of acetone to water being approximately 1:2 to improve the wetting property on cathode bone. Between about 5 to about 500 mg/cm$^2$ (cell geometrical area), in some embodiments about 7.5 mg/cm$^2$ of BCFZ was then infiltrated into a porous cathode bone under vacuum using micro-liter syringe to control the amount of loading. The infiltrated cells may then be fired at a temperature between about 500° C. to about 1100° C., in some embodiments about 900° C. for between about 1 hours to about 10 hours, in some embodiments about 5 hours to obtain the desired crystalline phase of BCFZ.

Another aspect of the present invention is a protonic ceramic fuel cell. The fuel cell includes an anode substrate, a layer of an electrolyte over the anode substrate, a porous bone cathode over the layer of the electrolyte and a perovskite-type oxide within the porous cathode bone. The perovskite-type oxides are nanoparticles.

The PCFC cell may be stable in operation for more than about 1000 hours using hydrogen as fuel. The power density of the PFC may be between about 20 and about 1000 mW/cm$^2$, in some embodiments at a density of about 400 mW/cm$^2$, at a temperature between about 300° C. and about 800° C., in some embodiments about 500° C., under a hydrogen/air gradient. When methane is used as a fuel source, the power density may be between about 10 and about 400 mW/cm$^2$, in some embodiments about 80 mW/cm$^2$ at a temperature between about 450° C. and about 700° C., in some embodiments about 500° C.

EXAMPLES

Example 1

Fabrication

Figure 2:
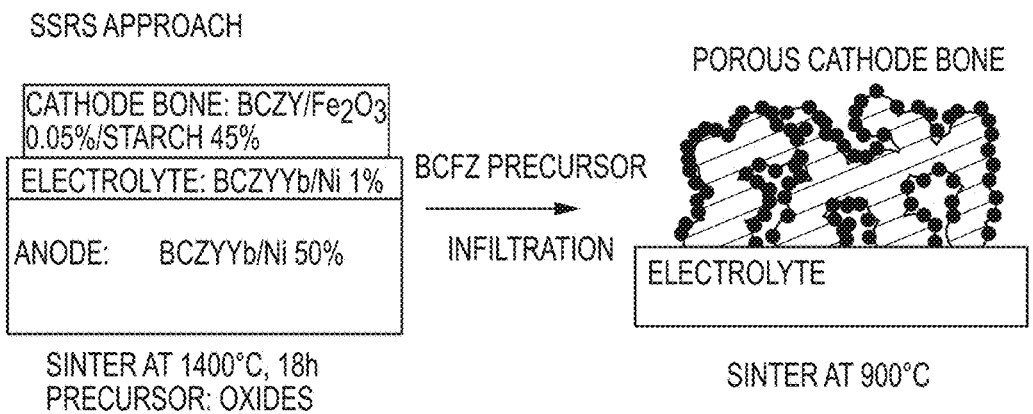
FIG. 2 illustrates the SSRS method of the present invention.
Figure 3A:
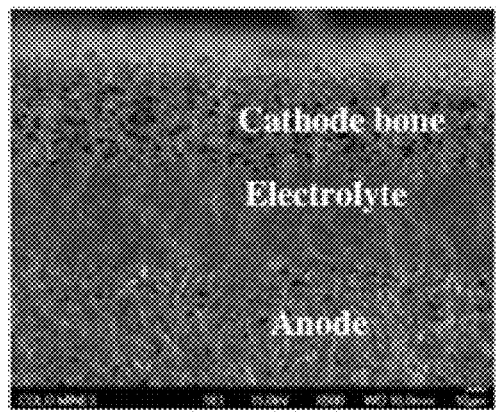
FIG. 3a illustrates a cross sectional view of the sandwiched microstructures of a single cell.
Figure 3B:
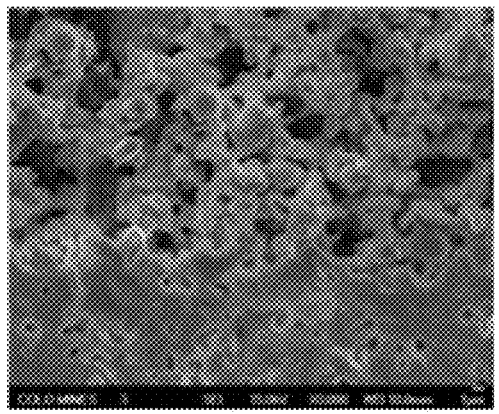
FIG. 3b illustrates a cross sectional view of the interface microstructures and a morphology of the intergrowth between the electrolyte and cathode of a single cell.
Figure 3C:
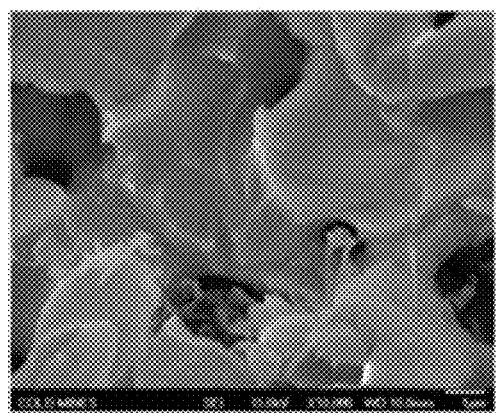
FIG. 3c illustrates a cross sectional view of the microstructures and morphologies of the cathode of a single cell before infiltration with BCFZ.
Figure 3D:
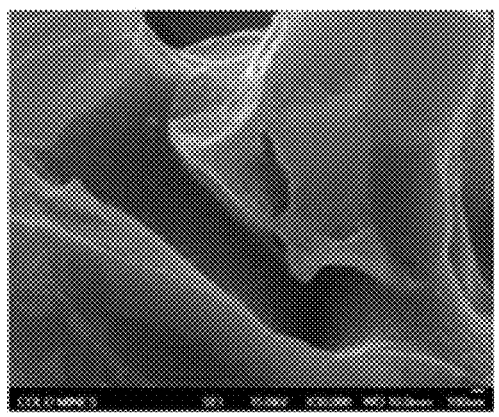
FIG. 3d illustrates a cross sectional view of the microstructure and morphology of the cathode of a single cell after infiltration with BCFZ.

The overall synthesis procedure employed for the preparation of the single cell is illustrated in FIG. 2. The three-layer structure was sintered only once to form the basic single cell. Then, the BCFZ precursor was infiltrated into the porous cathode bone to form the nanoparticles on the surface of the cathode bone. As a result, the single cell was obtained in a relatively simple, cost-effective, and scalable process.

Materials

Generally, barium carbonate and other metal oxides (Alfa Aesar) were used as raw materials for the synthesis of the powder of the anode, electrolyte, and cathode bone. Stoichiometric amounts of $BaCO_3$, $CeO_2$, $ZrO_2$, $Y_2O_3$, $Yb_2O_3$, and NiO were weighed and mixed with 2-propanol as a ball milling medium to produce a BCZYYb/NiO50% precursor mixture as anode. Proper amount of $BaCO_3$, $CeO_2$, $ZrO_2$, $Y_2O_3$, $Yb_2O_3$, and NiO were also ball milled to produce a BCZYYb/NiO1% precursor mixture as electrolyte. For the cathode bone, the $BaCO_3$, $CeO_2$, $ZrO_2$, $Y_2O_3$, $Fe_2O_3$, and starch were ball milled to produce a BCZY63/$Fe_2O_3$1%/Starch45% precursor mixture. After ball milling for about 24 hours, drying at about 90° C. for about 24 hours, anode powder was dry pressed under about 375 MPa pressure for about 120 seconds (in a circular carbon-aided steel dry pressing die with diameter of about 19 mm) to form the anode substrate pellet. Then, slurries of BCZYYb/NiO1% and BCZY63/$Fe_2O_3$1%/Starch45% were prepared by mixing about 30 grams powder with 6 grams 20 wt % solsperse 28000 (Lubrizol) in Terpinol and 2 grams of 5 wt % binder (V-006, Heraeus) in Terpinol. Thus, the ratio of the powder:dispersant:binder was about 15:3:1. Next, a thin layer of BCZYYb/NiO1% was deposited on the anode support by a screen printing process. Then, the BCZY63/$Fe_2O_3$1%/Starch45% slurry was printed onto the top of the BCZYYb/NiO1% layer and co-fired at about 1400° C. for about 18 hours to form the a basic single cell.

About 0.05 M concentration of aqueous nitrate solutions of BCFZ precursor was prepared by dissolving metal nitrates in water with proper amount of citric acid (molar ratio of citric acid:total metal ions controlled to be around 1.5:1), which was used as a complex agent to facilitate the formation of the desired perovskite phase. Acetone was added to the aqueous solutions with a volume ratio of acetone to water being about 1:2 to improve the wetting property on cathode bone. About 10 μL of BCFZ solution was then infiltrated into a porous cathode bone under vacuum using micro-liter syringe to control the amount of loading. The infiltrated cells were fired at 900° C. for 5 hours to obtain the desired crystalline phase of BCFZ.

Analysis of the Cells

The microstructure and chemical composition of the sintered pellets were investigated by means of Field Emission Scanning Electron Microscopy (FESEM, JEOL JSM7000F). Electrochemical impedance spectroscopy (EIS) of single cells was performed with a Gamry Reference 600 Potentiostat/Galvanostat/ZRA using a signal amplitude of 10 mV under open circuit voltage (OCV) conditions in the frequency range of 0.01-10$^6$ Hz. For I-V polarization tests, a cell was sealed onto a tube reactor with the cathode side exposed to air at a flow rate of 100 mL/min (STP) while the anode was swept with hydrogen gas at a flow rate of 80 mL/min (STP). I-V polarization curves were collected using the Gamry potentiostat. For methane testing, following reduction of anode in $H_2$, the cell was conditioned in hydrogen gas as was just described, and then wet methane with a flow rate of 10 mL/min (passing through a water bubbler at room temperature) was fed into the cell at different temperature.

FIG. 3 illustrates some typical microstructures and morphologies (SEM images) of the cross-sectional view of the single cell before (FIG. 3a, FIG. 3b, and FIG. 3c) and after (FIG. 3d) infiltration with 10 μL BCFZ solution of 0.05M. The anode-supported fuel cell was constructed from an about 1 mm thick of about 50% NiO doped BCZYYb anode with an about 40 μm thick screen-printed dense about 1% NiO doped BCZYYb electrolyte and an about 40 μm thick porous cathode bone (FIG. 3a). There are many fine BCZY63 grains in the blank cathode bone appear relatively smooth and clean, which have a grain size around 1-3 μm, forming a high surface area (FIG. 3c). It is well known that increasing the surface area of the cathode can promote the surface exchange kinetics and increase the number of active reaction sites, which reduces the total polarization resistance of the cathode. The high surface area achieved for this cathode bone may therefore contribute to its excellent performance. In addition, good adhesion between the cathode bone and the electrolyte was also observed (FIG. 3b). After infiltration with about 10 μL BCFZ solution and sinter at about 900° C., a uniform layer of BCFZ nanoparticles was formed on the surfaces of BCZY63 grains (FIG. 3d). The BCFZ nanoparticles are very fine and seem to form a uniform continuous layer on the inner surface of the porous cathode bone. The BCFZ nanoparticles are relatively uniform and size was in range of about 50-100 nm, as estimated from the enlarged SEM image (FIG. 3d).

Figure 4A:
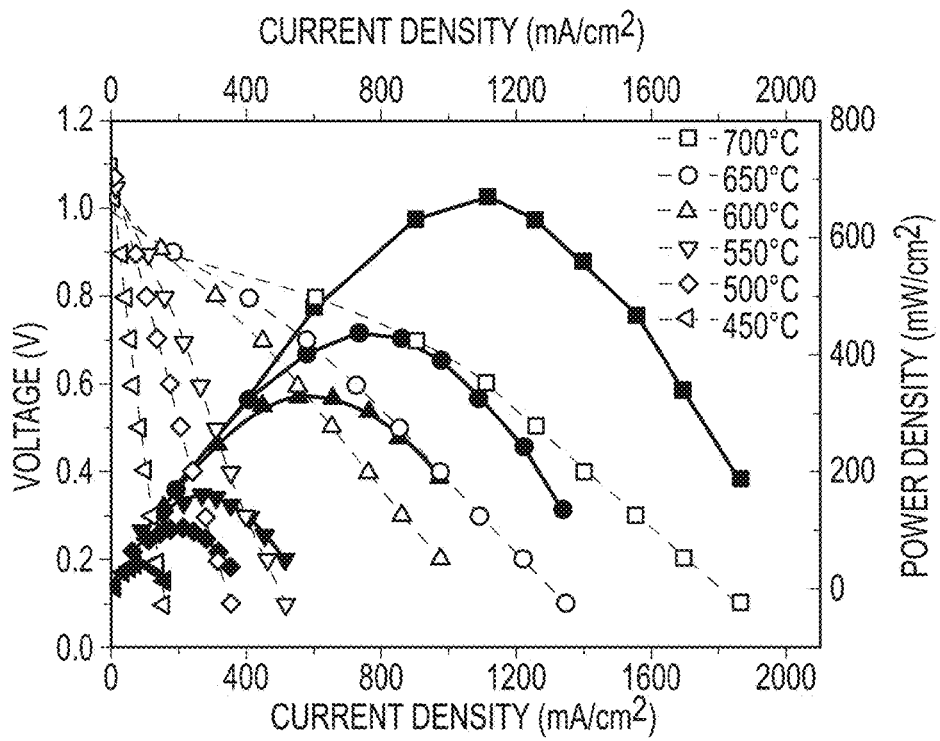
FIG. 4a illustrates the performance of a single cell using hydrogen as fuel and air as the oxidant at high temperatures.
Figure 4B:
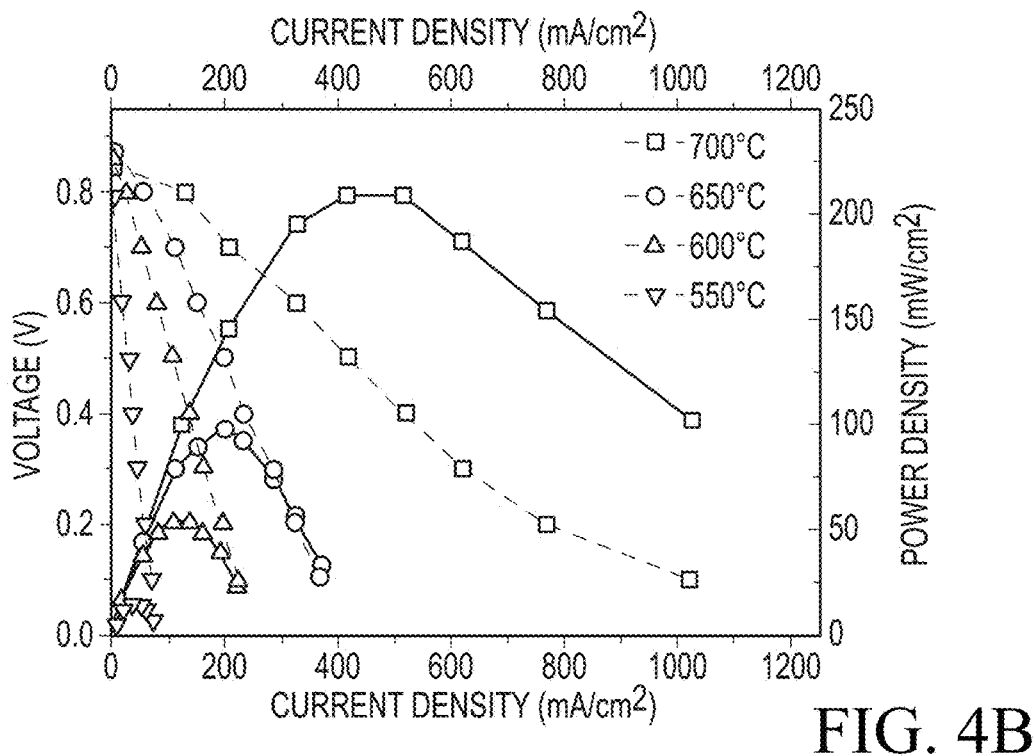
FIG. 4b illustrates the performance of a single cell using methane as fuel and air as the oxidant at high temperatures.

To determine the performance of the single cell in fuel cell conditions, the current-voltage characteristics of a fuel cell employing the single cell were investigated in a conventional dual chamber fuel cell with hydrogen supplied to the anode chamber and air supplied to the cathode chamber. The anode-supported fuel cell was constructed from an about 1 mm thick of about 50% NiO doped BCZYYb anode with an about 40 μm thick screen-printed dense BCZYYb electrolyte and an about 40 µm thick porous cathode bone with BCFZ nanoparticles infiltrated in the pore. The open circuit voltage (OCV) illustrated in FIG. 4a are about 0.95 V at about 700° C. and about 1.05 V at about 600° C., suggesting that the voltage drop caused by current leakage and fuel/gas cross flow is negligible. The peak power densities of the fuel cell are about 105 mW/cm$^2$, about 330 mW/cm$^2$, and 670 mW/cm$^2$ at about 500 C, about 600 C, and 700° C., respectively. Compared with a single cell prepared under the traditional procedure with a BCFZ cathode, the output of the single cell prepared by SSRS method is much higher, which is attribute to the dense electrolyte and porous cathode with mixed conducting property. Moreover, the single cell displayed a peak power density of about 224 mW/cm$^2$ and about 60 mW/cm$^2$ at about 700° C. and about 600° C. when wet methane was used as the fuel (FIG. 4b), showing a considerably high resistance to coking and power output for a intermediate temperature PCFC running on wet hydrocarbon.

Figure 5:
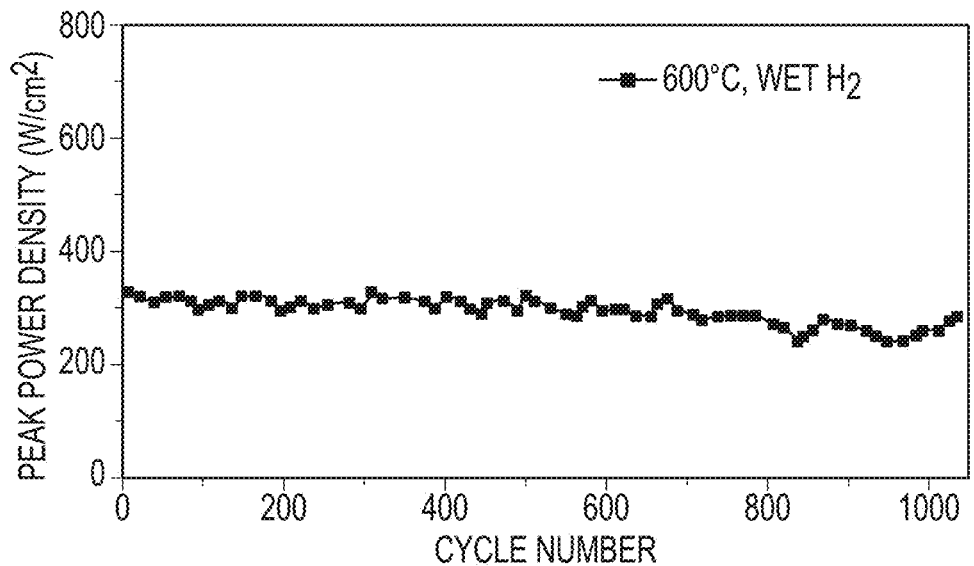
FIG. 5 illustrates cycling date of a cell showing the number of cycles and peak power density at 600° C. for wet hydrogen gas.

In addition to excellent electrochemical performance, long-term stability, especially at intermediate temperatures, is another important factor to consider for the practical application of fuel cell. To evaluate the electrochemical stability of this single cell, the cell was repeatedly for power cycles from open circuit voltage (OCV) to about 0.3 V and back to OCV under about 600° C. in wet hydrogen gas. The potential sweeping rate was about 10 mV/s. The single cell is electrochemically stable under the testing conditions, as demonstrated by the cycling data illustrated in FIG. 5. FIG. 5 illustrates a voltages measured at a current density of about 256 mA/cm$^2$ at about 600° C. for single cell with wet hydrogen gas as the fuel and stationary air as oxidant for over about 21 days. After more than about 1000 cycles, the power density is nearly no change.

Figure 6:
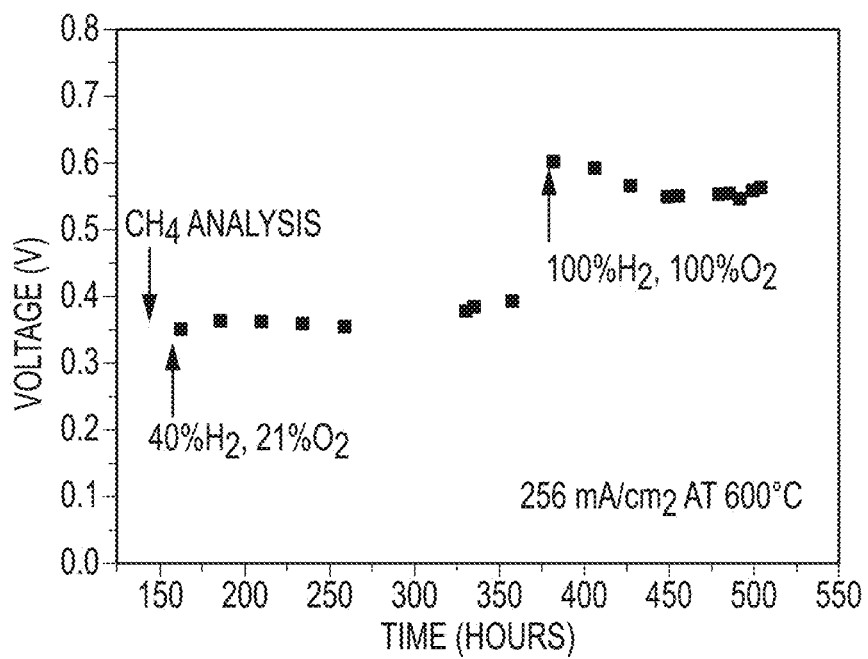
FIG. 6 illustrates open circuit voltages as a function of time at a constant current density of about 256 mA/cm$^2$ at about 600° C. for the single cell when wet hydrogen gas with different concentration was used as fuel and air as oxidant.
Figure 7A:
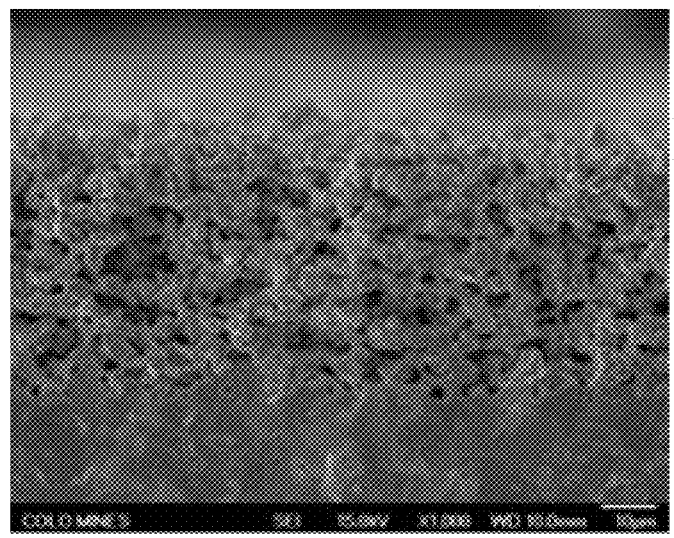
FIG. 7a illustrates a cross-sectional view of a single cell after operation at the interface of cathode bone and electrolyte.
Figure 7B:
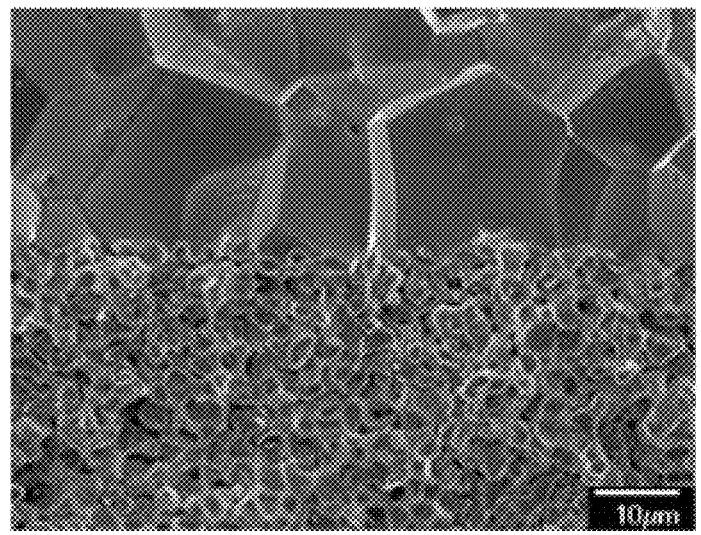
FIG. 7b illustrates a cross-sectional view of a single cell after operation at the interface of anode and electrolyte.

Furthermore, FIG. 6 illustrates open circuit voltages at a constant current density of about 256 mA/cm$^2$ at about 600° C. for the single cell when wet (~3 v % steam) hydrogen gas with different concentration was used as fuel and air as oxidant. It demonstrated stable OCV for over about 21 days when wet hydrogen gas was used as fuel. The SEM micrograph of the single cell cathode bone-electrolyte and anode-electrolyte interface after test is illustrated in FIG. 7. FIG. 7 illustrates a cross-sectional view of a single cell after operation. FIG. 7a illustrates the interface of cathode bone and electrolyte, and FIG. 7b illustrates interface of anode and electrolyte. The cathode bone-electrolyte interface shows no signs of degradation and the continuous well bonded interfacial character is preserved without visible cracking or pore formation, suggesting good thermal expansion compatibility and stability of the cathode bone with the BCZYYb-1% NiO electrolyte. Further, the anode is also still firmly adhered to the electrolyte surface without evidence for delimitation. The remarkable performance and stability suggest that the single cell prepared by cost-effective SSRS method is an attractive component for intermediate temperature PCFCs.

Example 2

Fabrication

Figure 8A:
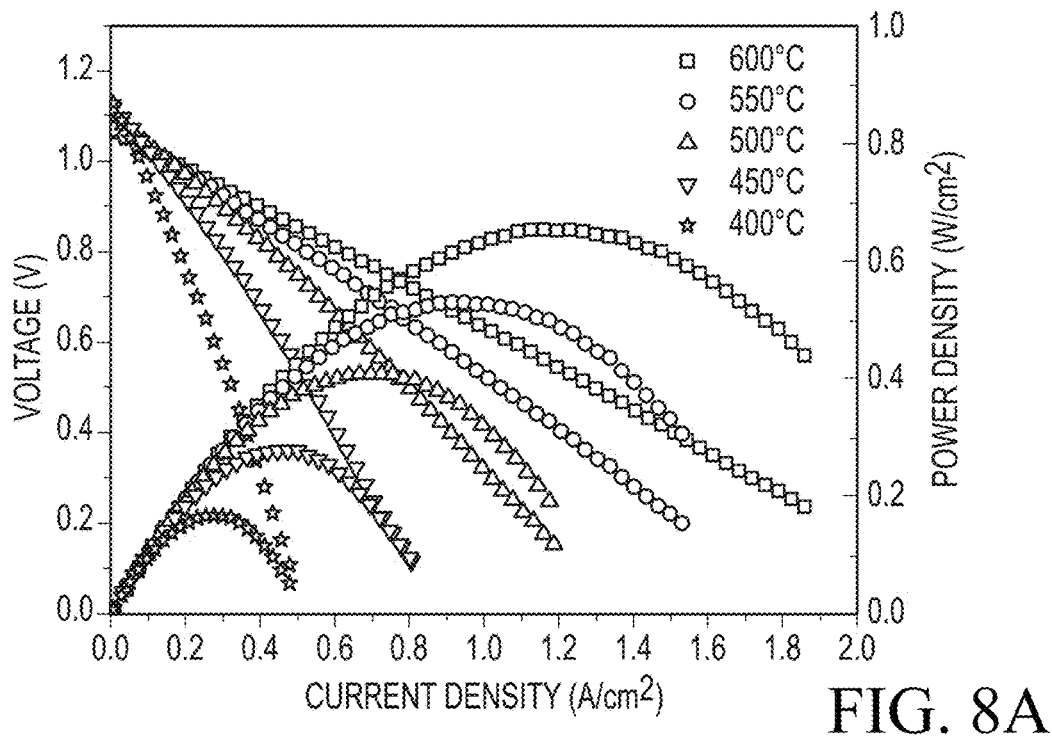
FIG. 8a illustrates the power density over various temperature ranges of a single cell for hydrogen as the fuel and air as the oxidant.
Figure 8B:
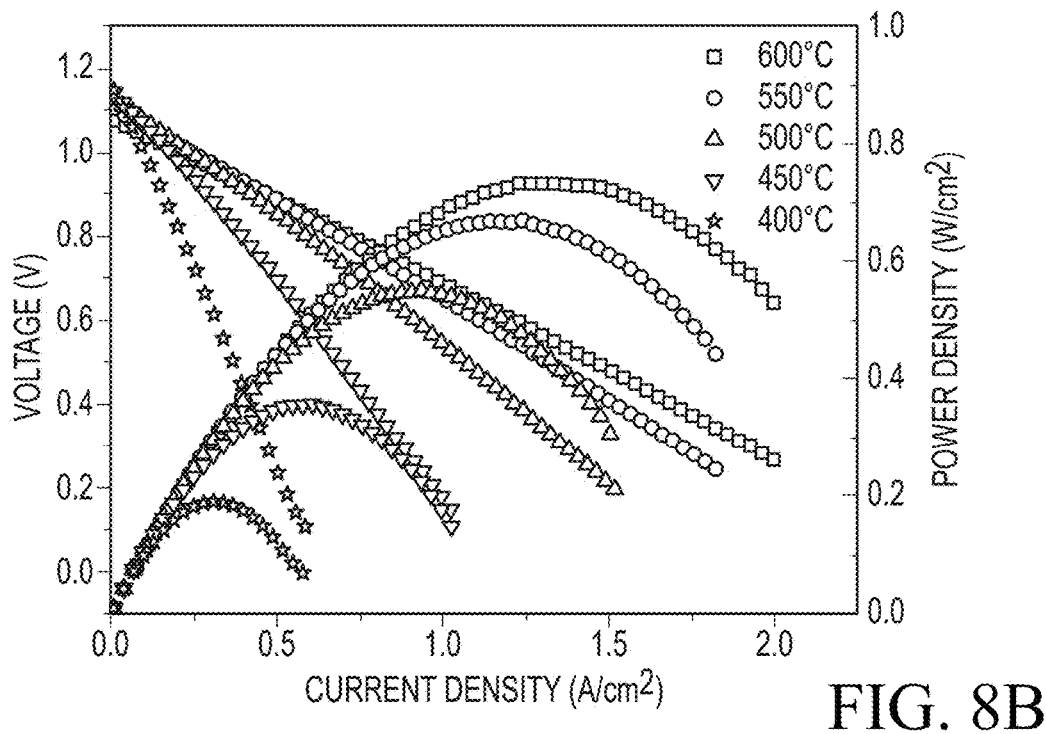
FIG. 8b illustrates the power density over various temperature ranges of a single cell for hydrogen as the fuel and oxygen as the oxidant.
Figure 9B:
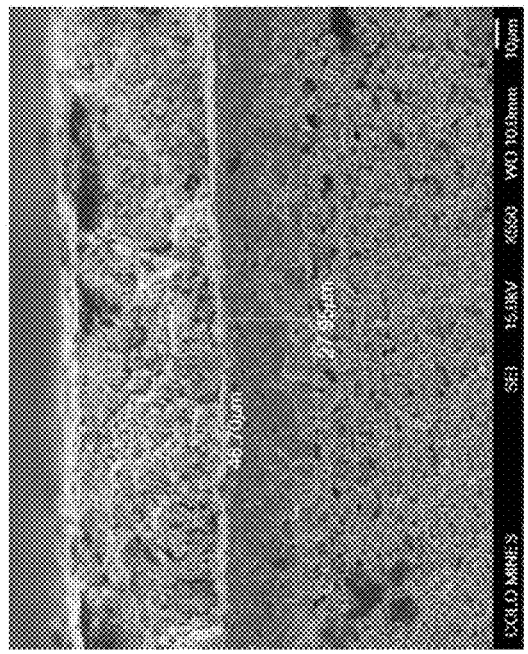
FIG. 9b illustrates the microstructure of a single cell after a stability test.
Figure 9A:
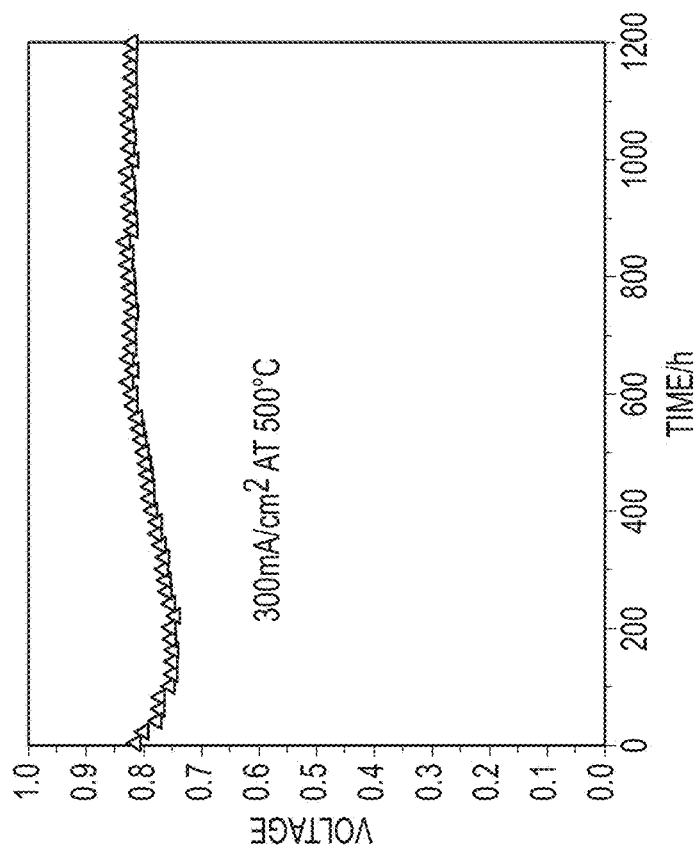
FIG. 9a illustrates the voltage versus time under constant current density of about 300 mA/cm$^2$ at about 500° C. for a single cell.

In order to improve the performance, the nickel amount in the anode was increased to about 60 wt %. The anode-supported electrolyte half-cell of BCZYYb+1.0 wt % NiO was fabricated by firing at about 1400° C. for about 18 hours, and the cathode of BCFZY was screen printed onto the half-cell and annealed at about 900° C. for about 5 hour. Analysis of the Cell The performance of this single cell was tested at the temperature range from about 400 to about 600° C. under hydrogen/air and hydrogen/oxygen, respectively. It is clear that the high power densities of about 400 mW/cm$^2$ illustrated in FIG. 8a and about 500 mW/cm$^2$ illustrated in FIG. 8b were obtained at about 500° C. under gradients of hydrogen/air and hydrogen/oxygen, respectively, which are the record performance for PCFCs at this low temperature. FIG. 9 illustrates the stability of PCFC single cell of about 40 wt. % BCZYYb+60 wt. % NiO|BCZYYb+1.0 wt. % NiO|BCFZY. FIG. 9a illustrates the voltage versus time under constant current density of about 300 mA/cm$^2$ at about 500° C. The output voltage about 0.82V was kept steadily more than about 1200 hours while keeping constant current density of about 300 mA/cm$^2$ at about 500° C. as illustrated in FIG. 9a. FIG. 9b illustrates the microstructure of the PCFC single cell after stability test. The morphology was kept constant after a long time as illustrated in FIG. 9b.

Example 3

Fabrication

Figure 10A:
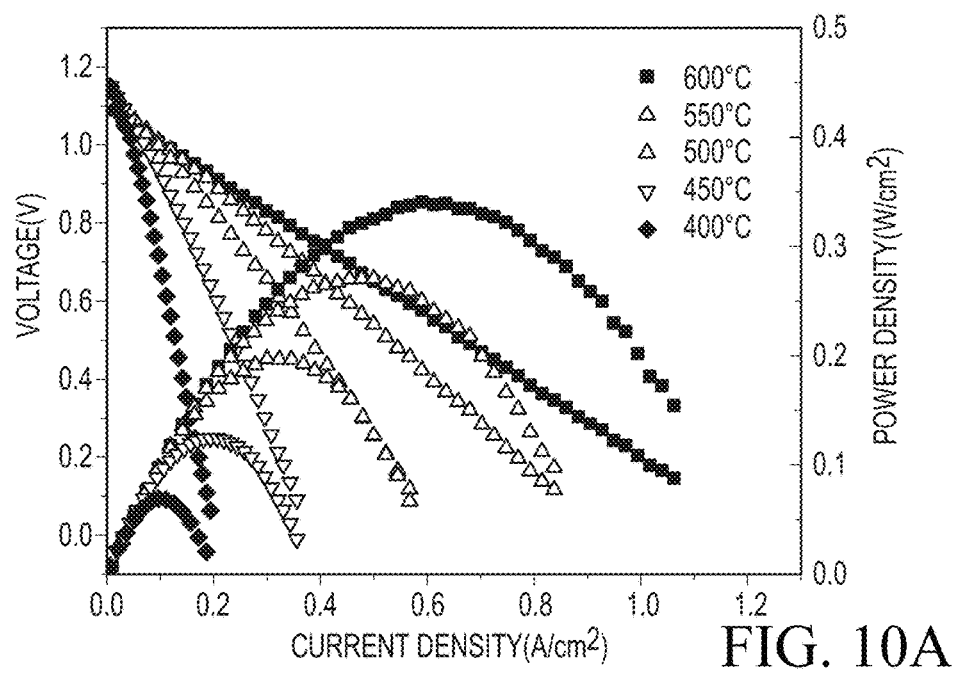
FIG. 10a illustrates that power densities of a single cell where hydrogen was used as the fuel and air was used as the oxidant.
Figure 10B:
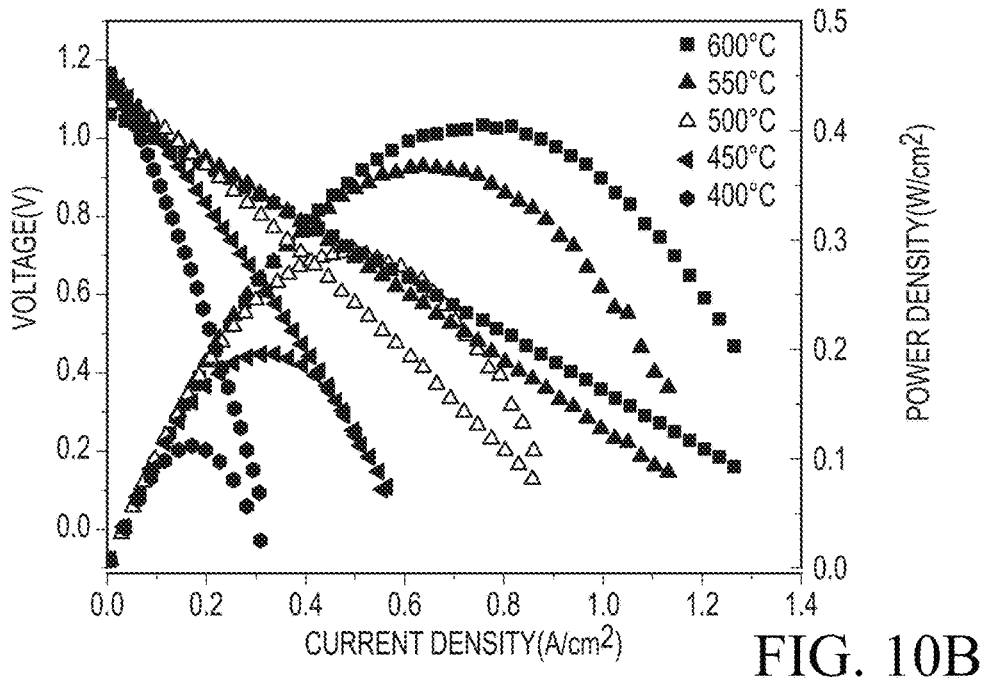
FIG. 10b illustrates that power densities of a single cell where hydrogen was used as the fuel and oxygen was used as the oxidant.

Another PCFC single cell of 40 wt. % BCZYYb+60 wt. % NiO|BCZYYb+1.0 wt % NiO|BCZY63+0.5 mol % Fe$_2$O$_3$+BCFZY was fabricated by one step SSRS method. The sandwiched single cell of anode, electrolyte, and cathode bone was fabricated by SSRS fired at about 1400° C. for about 18 hours, active cathode phase (about 5 mg/cm$^2$) was infiltrated and annealed at about 900° C. for about 5 hours. FIG. 10 illustrates the performance of PCFC single cell of 40 wt. % BCZYYb+60 wt. % NiO|BCZYYb+1.0 wt % NiO|BCZY63+0.5 mol % Fe$_2$O$_3$+BCFZY. FIG. 10 illustrates that power densities of about 200 mW/cm$^2$ and about 300 mW/cm$^2$ were obtained at about 500 C under hydrogen/air (FIG. 10a) and hydrogen/oxygen (FIG. 10b), respectively.

Figure 11:
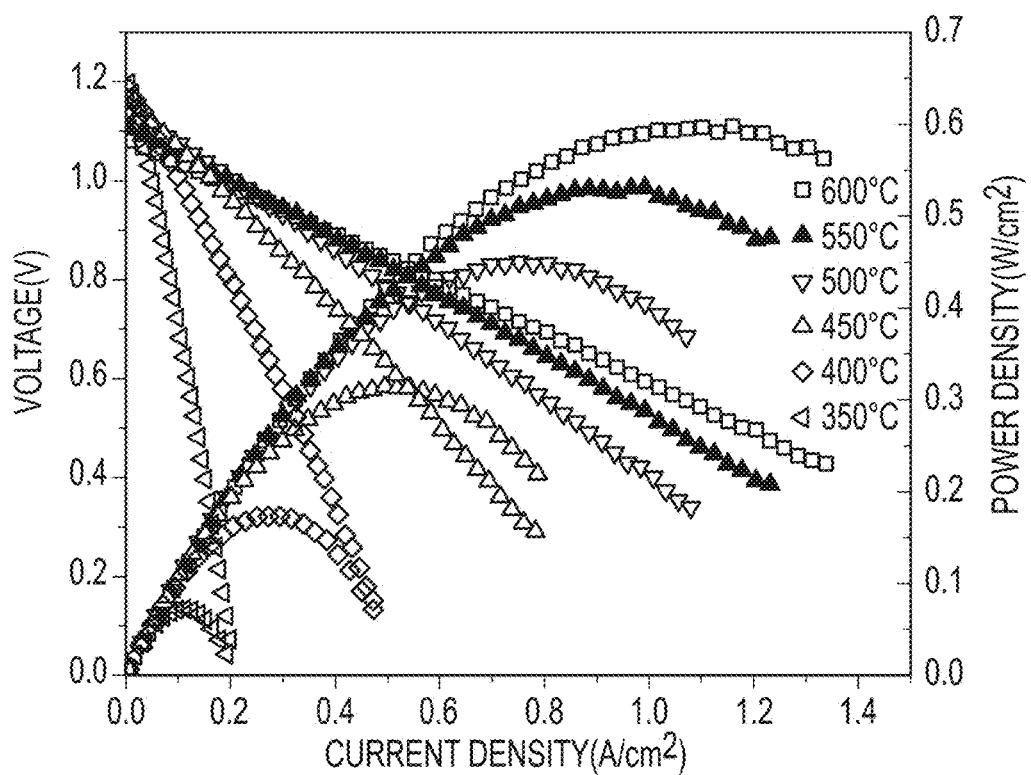
FIG. 11 illustrates the performance of a single cell.
Figure 12A:
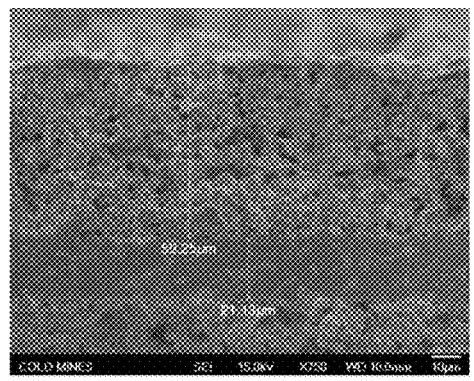
FIG. 12a illustrates the cross section of the sandwiched structure a single cell.
Figure 12B:
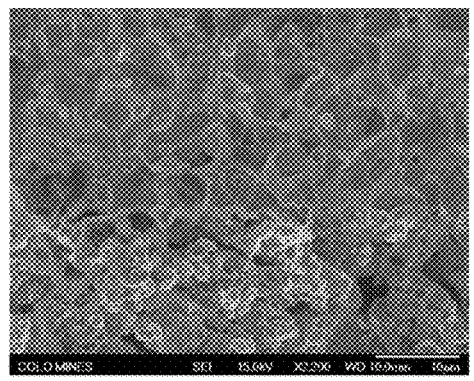
FIG. 12b illustrates the interface between an anode and an electrolyte of a cell.
Figure 12C:
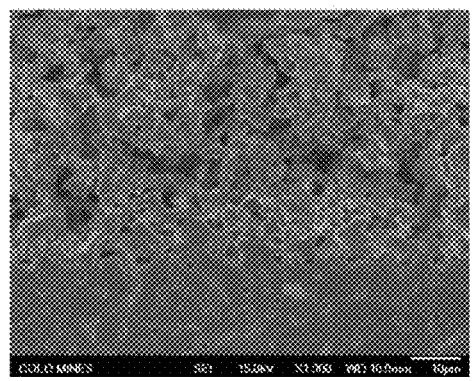
FIG. 12c illustrates the interface between a cathode and an electrolyte of a cell.
Figure 12D:
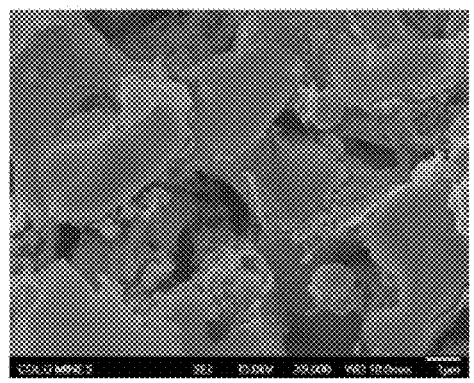
FIG. 12d illustrates the infiltrated active cathode phase of a single cell.

FIG. 11 illustrates the performance of PCFC single cell of 40 wt. % BCZYYb+60 wt. % NiO|BCZYYb+1.0 wt % NiO|BCZY63+0.5 mol % Fe$_2$O$_3$+BCFZY. By further increase the infiltration of active cathode phase (as illustrated in FIG. 11), the power density of about 320 mW/cm$^2$ was obtained under hydrogen/air gradient. FIG. 12 illustrates the morphology of the single cell after testing, which indicates that electrolyte is fully densified, the intergrowths between anode and electrolyte and cathode bone and electrolyte are pretty good. The nanoparticle of cathode active phase was deposited on the pore wall of cathode bone.

FIG. 12 illustrates the microstructures of used PCFC single cell of 40 wt. % BCZYYb+60 wt. % NiO|BCZYYb+ 1.0 wt % NiO|BCZY63+0.5 mol % Fe$_2$O$_3$+BCFZY. FIG. 12a illustrates the cross section of sandwiched structure, FIG. 12b illustrates the interface between anode and electrolyte, FIG. 12c illustrates the interface between cathode and electrolyte, and FIG. 12d illustrate the infiltrated active cathode phase.

Example 4

Fabrication

The SSRS fabrication method was further extended the electrolyte of BCZY63 and sintering aid of CuO. The PCFC single cell of 40 wt. % BCZY63+60 wt. % NiO|BCZY63+ 5.0 mol % CuO|BCFZ was fabricated by SSRS. Anode supported electrolyte half-cell was fabricated by SSRS fired at about 1450° C. for about 12 hours, cathode was screen printed on the half-cell and annealed at about 900° C. for about 5 hours.

Analysis of the Cell

Figure 13A:
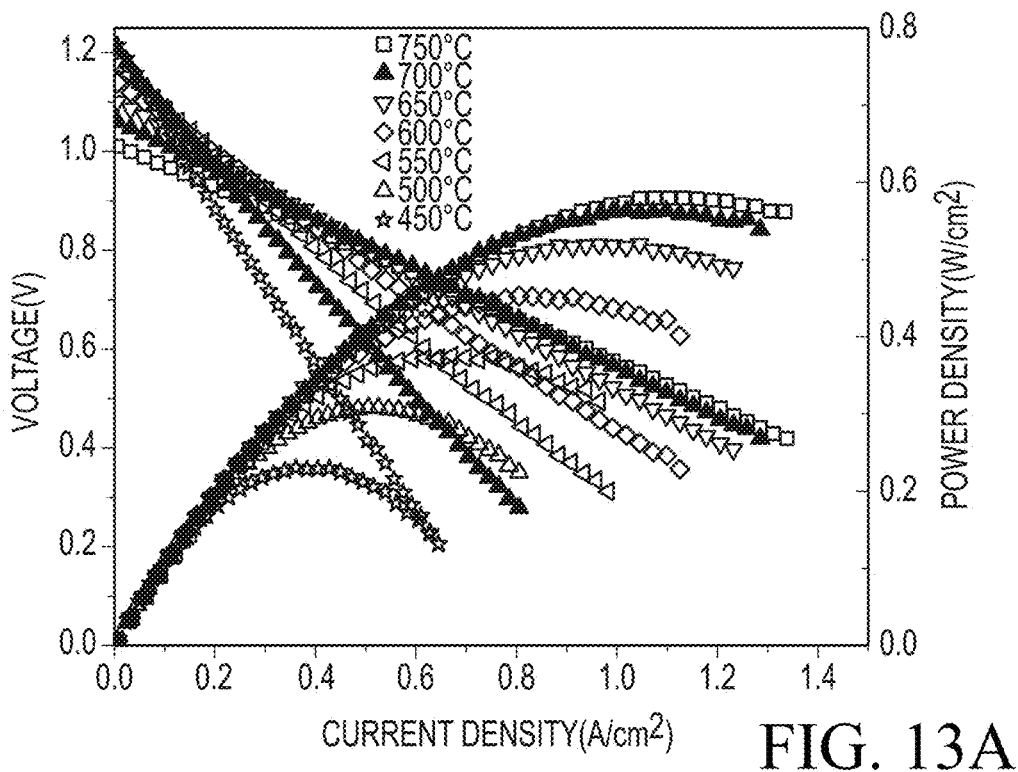
FIG. 13a illustrates an I-V curve under a hydrogen/air gradient.
Figure 13B:
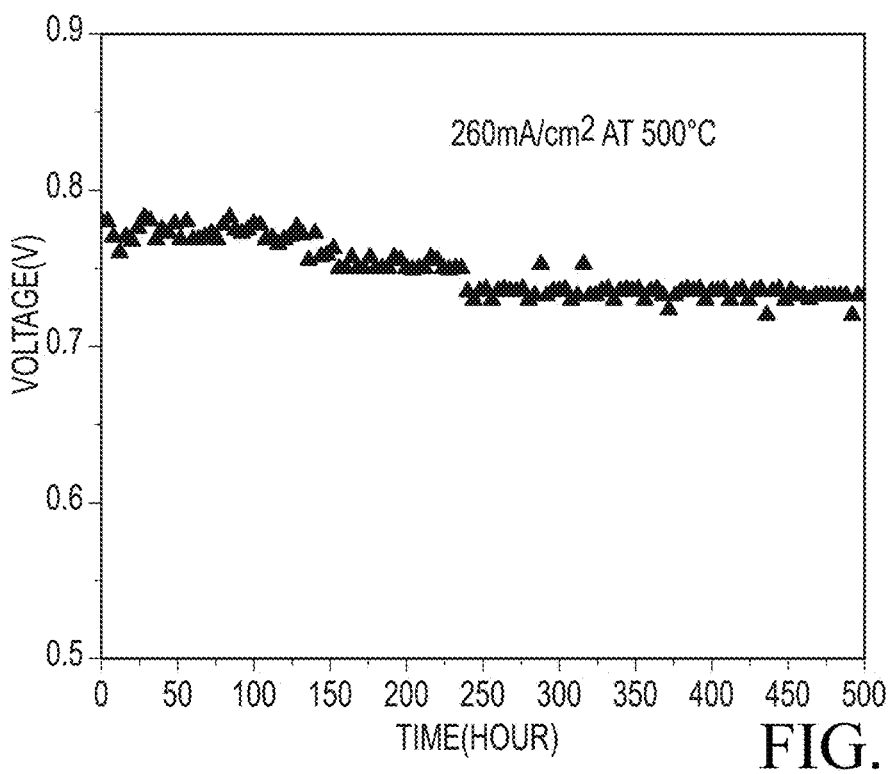
FIG. 13b illustrates a stability curve.

FIG. 13 illustrates the performance of PCFC single cell of 40 wt. % BCZY63+60 wt. % NiO|BCZY63+5.0 mol % CuO|BCFZ. FIG. 13a illustrates an I-V curve, and FIG. 13b illustrates the stability curve. FIG. 13a illustrates the I-V curve of this single under hydrogen/air gradient at different temperature. It is clear that the power density of about 320 mW/cm$^2$ was obtained at about 500 C, which is comparable with the single cells based on BCZYYb. Furthermore, FIG. 13b illustrates the performance of this cell is also very stable. Just slight voltage decrease was found within the first about 250 hours while keeping current density of about 260 mA/cm$^2$ at about 500° C. The power density over the last about 250 hours is fairly stable.

Example 5

Fabrication

A PCFC single cell of 40 wt. % BZY20+60 wt. % NiO|BZY20+5.0 mol % CuO BCFZY was formed. The anode supported electrolyte half-cell was fabricated by SSRS fired at about 1450° C. for about 12 hours, cathode was screen printed on the half-cell and annealed at about 900° C. for about 5 hours under hydrogen/air gradient.

BZY20 is the one of the best proton conductors. However, its sintering ability is not good. The BZY20 material usually needs about 1600° C. to become fully dense at which temperature BaO will evaporate. Thus, a sintering material may be used. In this experiment, 5 mol % CuO was added as sintering aid to improve its sintering ability and decrease its sintering temperature. The process to fabricate the cell is the same with BCZYYb cell (Example 2). The only difference is that the sintering temperature of the cell was at about 1450° C. to have fully dense BZY20-5 mol % electrolyte. The composition of this cell is 40% BZY20+60% NiO|BZY20-5 mol % CuO|BCFZY.

Analysis of the Cell

Figure 14:
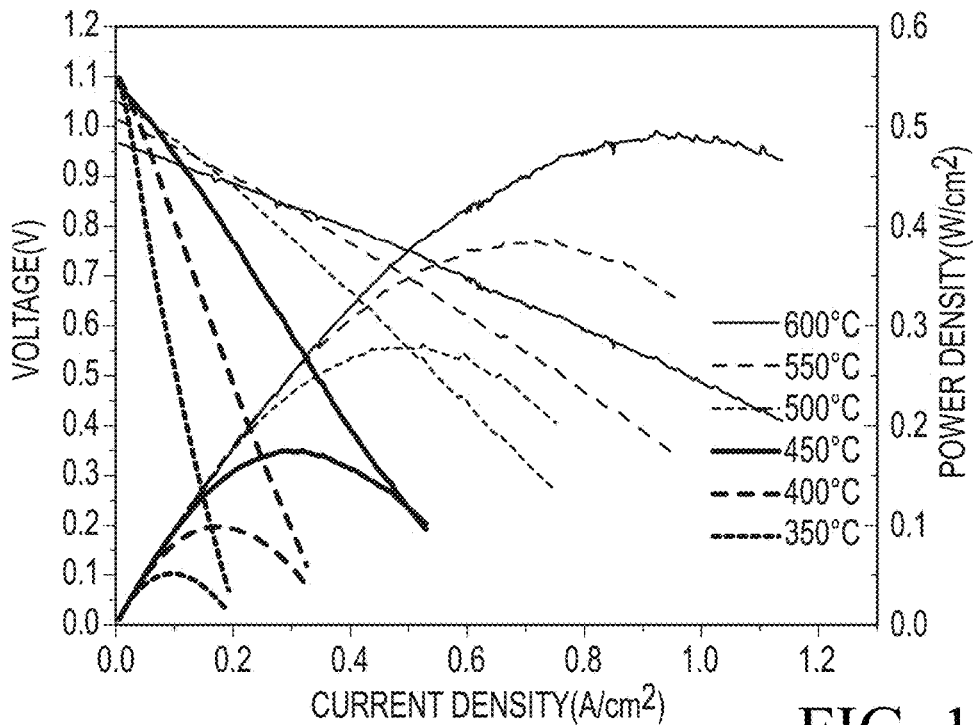
FIG. 14 illustrates the performance of a single cell using hydrogen as fuel and air as the oxidant.

FIG. 14 illustrates the performance of BZY20 cell using hydrogen as fuel and air as the oxidant. The peak power density at about 600° C., about 550° C., about 500° C., about 450° C., about 400° C. and about 350° C. is about 0.5 W/cm$^2$, about 0.39 W/cm$^2$, about 0.275 W/cm$^2$, about 0.15 W/cm$^2$, about 0.1 W/cm$^2$ and about 0.07 W/cm$^2$ respectively, which is the best performance of PCFC using BZY20 as the electrolyte. The current density is higher than about 0.5 A/cm$^2$ when the voltage across the load is about 0.78V at about 500° C.

Example 6

Fabrication

Another PCFC single cell of 40 wt. % BZY20+60 wt. % NiO|BZY20+5.0 mol % CuO|BCFZY was formed by the same method described in example 5.

Analysis of the Cell

Figure 15:
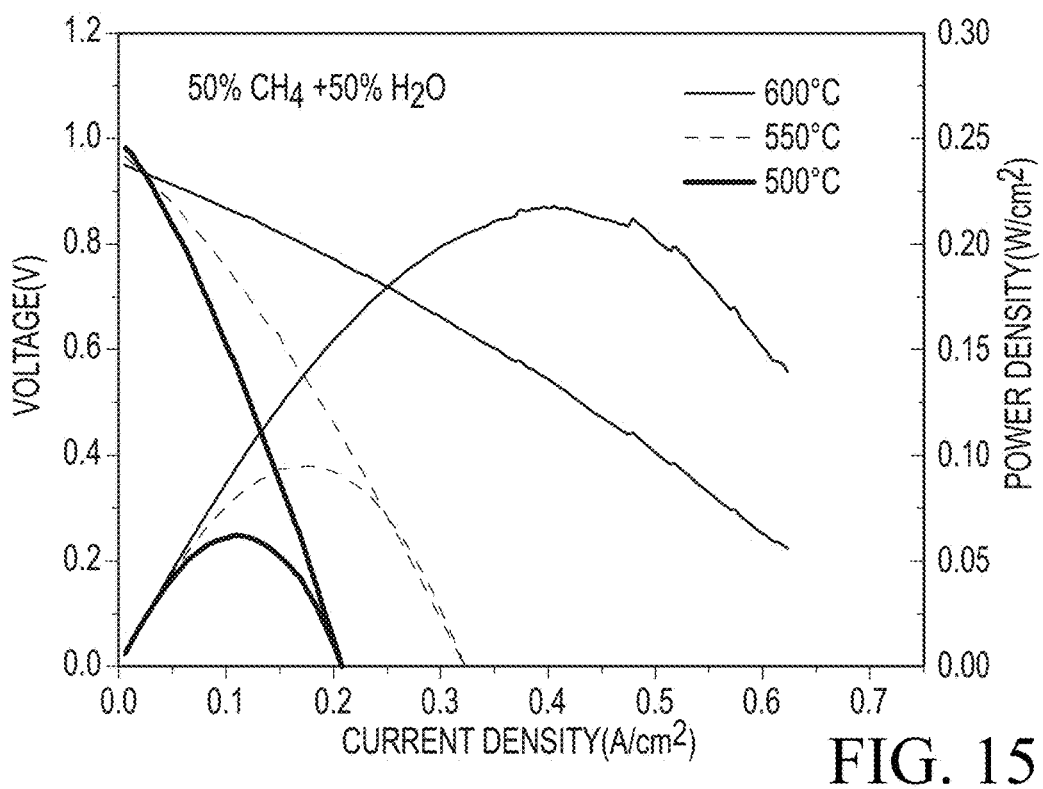
FIG. 15 illustrates the performance of a single cell using methane as fuel and air as the oxidant.

As illustrated in FIG. 15, the current performance of a 19 mm BZY20-based under CH$_4$ operation at 500° C. comes very close to meeting a target of about 80 mA/cm$^2$ at about 0.78V at about 500° C. under methane operation versus milestone target of about 100 mA/cm$^2$.

Example 7

Fabrication

Figure 16:
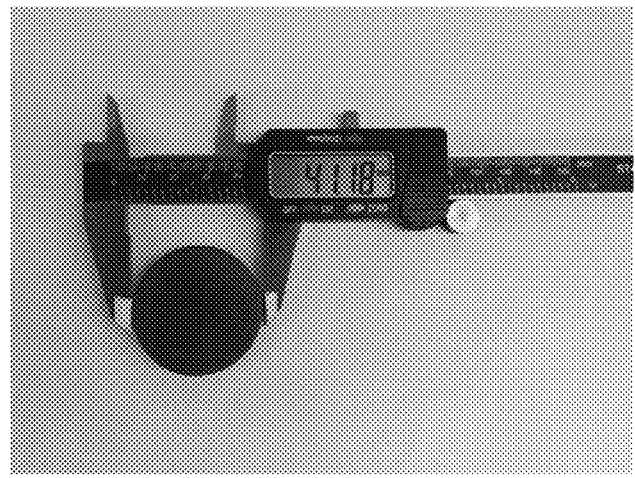
FIG. 16 illustrates the picture of a 40-mm PCFC cell.

The fabrication procedure for a larger 40 mm cells involves pressing about 14 g of anode precursor power (50% BCZYYb+50% NiO+12 wt % Starch) into an about 50 mm green pellet using a uniaxial die-press. Next, the electrolyte paste (BCZYYb-1 wt % NiO) is printed onto the surface of the about 50 mm pellet. The anode+electrolyte bi-layer cell is sintered at about 1400° C. for about 18 hours. Finally, the cathode paste (5 g BCFZY powder+0.3 g 5 wt % binder+1 g 20 wt % solsperse) is printed onto the top surface of the pellet and the cell is fired a second time at about 900° C. for about 5 hours. An example of the resulting about 40 mm FlexPCFC produced using this two-step procedure is shown in FIG. 16. The 40 mm cells were produced with 95% fabrication yield using this SSRS approach. The 40 mm cells can be produced in batches of 16 cells at a time, with each batch taking about 3 days to fabricate, representing a significant increase in throughput compared to traditional SOFC fabrication processes which require 5-7 days.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method for fabricating a protonic ceramic fuel cell, comprising:
    preparing an electrolyte precursor;
    preparing an anode precursor;
    preparing a cathode precursor; and
    reactive sintering in a single step the electrolyte precursor, the anode precursor, and the cathode precursor with a proton conducting ceramic at a temperature of less than about 1400° C. to form the protonic ceramic fuel cell comprising an electrolyte, an anode and a cathode.

2. The method of claim 1, wherein a material for the anode precursor is at least one of a BCZYYb, a BCZY63, a BZY20 and a NiO.

3. The method of claim 1, wherein the anode is at least one of BCZYYb/Ni 1%, or BCZY63/Cu.

4. The method of claim 2, wherein the material of the anode precursor is the BCZYYB and the NiO.

5. The method of claim 4, wherein the material of the anode precursor comprises between about 40 wt. % to about 50 wt. % of the BCZYYb and between about 50 wt. % to about 60 wt. % of the NiO.

6. The method of claim 2, wherein the material of the anode precursor is the BCZY63 and the NiO.

7. The method of claim 6, wherein the material of the anode precursor comprises between about 40 wt. % to about 50 wt. % of the BCZY63 and between about 50 wt. % to about 60 wt. % of the NiO.

8. The method of claim 2, wherein the material of the anode precursor is the BZY20 and the NiO.

9. The method of claim 8, wherein the material of the anode precursor comprises between about 40 wt. % to about 50 wt. % of the BZY20 and between about 50 wt. % to about 60 wt. % of the NiO.

10. The method of claim 1, wherein a material for the electrolyte precursor is at least one combination of a BCZYYb and a NiO, a BCZY63 and a CuO, or a BZY20 and a CuO.

11. The method of claim 1, wherein a material of the electrolyte precursor is at least one of a BCZYYb/Ni, a BCZY63/CuO, or a BZY20/CuO.

12. The method of claim 1, wherein a material for the cathode precursor is at least one of a BCZY63, a $Fe_2O_3$, a starch, a BCFZ, a BCFZY, and a BCZY27.

13. The method of claim 1, wherein the cathode comprises a BCZY63/$Fe_2O_3$/starch, a BCZY63/$Fe_2O_3$/BCFZ, a BCFZY, or a BCFZ.

14. The method of claim 1, further comprising infiltrating a perovskite-type oxide into the cathode precursor as a cathode nanoparticle at a temperature of between about 500° C. to about 900° C.

15. The method of claim 2, wherein the material for the anode precursor is compressed to form a compressed precursor material anode.

16. The method of claim 10, wherein the precursor material for the electrolyte precursor is mixed with a solvent to form a slurry.

17. The method of claim 12, wherein the precursor material for the porous cathode bone is mixed with a solvent to form a slurry.

18. The method of claim 1, further comprising:
compressing the anode precursor to form a compressed precursor anode;
mixing a solvent with the electrolyte precursor to form an electrolyte slurry;
applying the electrolyte slurry to the compressed precursor anode to form a half-cell;
mixing a solvent with the cathode precursor to form an cathode slurry; and
applying the cathode slurry to the half-cell.

19. The method of claim 1, wherein an interface between the cathode and the electrolyte comprises no visible cracking.

20. The method of claim 1, wherein the sintering does not result in cracking of an interface between the cathode and the electrolyte.

* * * * *